United States Patent
Nishio et al.

(10) Patent No.: US 11,501,332 B2
(45) Date of Patent: Nov. 15, 2022

(54) ADVERTISEMENT INFORMATION SHARING SYSTEM

(71) Applicant: WIDES LIMITED, Yokohama (JP)

(72) Inventors: Tatsuya Nishio, Yokohama (JP);
Masaaki Kamo, Yokohama (JP);
Kazuyuki Adachi, Yokohama (JP);
Takeshi Sudo, Yokohama (JP);
Norikazu Nakano, Yokohama (JP)

(73) Assignee: Wides Limited, Kanagawa (JP)

( * ) Notice: Subject to any disclaimer, the term of this patent is extended or adjusted under 35 U.S.C. 154(b) by 1373 days.

(21) Appl. No.: 14/768,935

(22) PCT Filed: Oct. 8, 2014

(86) PCT No.: PCT/JP2014/076933
§ 371 (c)(1),
(2) Date: Aug. 19, 2015

(87) PCT Pub. No.: WO2015/053310
PCT Pub. Date: Apr. 16, 2015

(65) Prior Publication Data
US 2016/0012477 A1 Jan. 14, 2016

(30) Foreign Application Priority Data

Oct. 8, 2013 (JP) ............................. JP2013-211244

(51) Int. Cl.
*G06Q 30/02* (2012.01)
*H04W 4/21* (2018.01)
(Continued)

(52) U.S. Cl.
CPC ..... *G06Q 30/0251* (2013.01); *G06Q 30/0241* (2013.01); *G06Q 30/0277* (2013.01);
(Continued)

(58) Field of Classification Search
CPC .......... G06Q 30/0251; G06Q 30/0241; G06Q 30/0277
(Continued)

(56) References Cited

U.S. PATENT DOCUMENTS

| 8,140,384 B2* | 3/2012 | Almeida ................ G06Q 30/02 705/14.16 |
| 2007/0260671 A1* | 11/2007 | Harinstein ............. G06Q 30/02 709/203 |
| 2008/0208682 A1 | 8/2008 | Chandley et al. |

FOREIGN PATENT DOCUMENTS

| JP | 2002-074147 | 3/2002 |
| JP | 2003-044731 | 2/2003 |

(Continued)

OTHER PUBLICATIONS

International Search Report of PCT/JP2014/076933, dated Dec. 22, 2014, and English language translation (2 pages total).
(Continued)

*Primary Examiner* — Azam A Ansari
(74) *Attorney, Agent, or Firm* — Hamre, Schumann, Mueller & Larson, P.C.

(57) ABSTRACT

The object of the present invention is to provide an advertisement information sharing system which allows anyone to easily carry out a manuscript publication of an article with an advertisement added thereto and by presenting such an advertisement as to draw attention of readers of the article, makes it possible to accelerate the manuscript publication of the advertisement article by the contributor and the browsing and utilization of the advertisement by the readers.

The advertisement information sharing system is provided with a contributor terminal for outputting an article with an advertisement added thereto, a user terminal for outputting user information and an advertisement information sharing (Continued)

server. The advertisement information sharing server records browsing history information having contributor information of an advertisement added article that is published to users having relevant information indicating connections between the contributor and a user, and browsed by the user and advertisement specifying information for specifying an advertisement added to the advertisement added article. The advertisement information sharing server comprises a manuscript publication means which adds the advertisement information relating to the advertisement target to the article information containing the contents relating to the advertisement target inputted from the contributor terminal so as to record the resulting information as an advertisement added article; a history collation means for carrying out a collating process with the browsing history information of the user, by utilizing the advertisement specifying information inputted in association with the user information; and an addition means in which when the authentication is confirmed by the history collation means, an advertisement utilization privilege is added to the privilege information of the user and the contributor described in the browsing history information. And the advertisement specifying information is associated with the user information in a corresponding store presented based upon the advertisement information of the target advertisement added article, and outputted to the advertisement information sharing server in association with the user information from the user terminal or a store terminal installed in the corresponding store.

13 Claims, 11 Drawing Sheets

(51) Int. Cl.
*H04L 67/02* (2022.01)
*H04L 67/50* (2022.01)
*H04L 9/40* (2022.01)
*H04L 67/10* (2022.01)

(52) U.S. Cl.
CPC .............. *H04L 63/08* (2013.01); *H04L 67/02* (2013.01); *H04L 67/10* (2013.01); *H04L 67/535* (2022.05); *H04W 4/21* (2018.02)

(58) Field of Classification Search
USPC ...................................................... 705/14.53
See application file for complete search history.

(56) References Cited

FOREIGN PATENT DOCUMENTS

| | | |
|---|---|---|
| JP | 2008-021303 | 1/2008 |
| JP | 2008-281726 | 11/2008 |
| JP | 2009-116629 | 5/2009 |
| JP | 2010-015456 | 1/2010 |
| JP | 2010-044585 | 2/2010 |
| JP | 2012-078305 | 4/2012 |
| JP | 2013-109642 | 6/2013 |
| JP | 2013-168186 | 8/2013 |
| KR | 10-1188900 | 10/2012 |
| KR | 10-2013-0011145 | 1/2013 |

OTHER PUBLICATIONS

Extended European Search Report, European Patent Application No. 14852082, filed May 3, 2017 (6 pages).
Office Action issued in corresponding Korean Patent Application No. 10-2016-7008287 filed Dec. 21, 2020, 7 pages.

* cited by examiner (a)

| ID | NAME | LOG-IN ID | LOG-IN PASSWORD | RELEVANCE INFORMATION | PRIVILEGE INFORMATION |
|---|---|---|---|---|---|
| 1001 | A | AAAA | **** | 1002 | 40 POINTS |
| 1002 | B | BBBB | ****** | 1001,1003 | 40 POINTS |
| 1003 | C | CCCC | ***** | 1002 | T4003, 20 POINTS |

(b)

| ID | NAME | LOG-IN ID | LOG-IN PASSWORD |
|---|---|---|---|
| 3001 | C MART O STREET SHOP | DDDD | **** |
| 3002 | C MART O STATION SHOP | EEEE | ****** |
| 3003 | M ON-LINE SHOP | FFFF | ***** |

Fig.4

| ARTICLE ID | CONTRIBUTOR ID | CONTRIBUTION TIME AND DATE | ADVERTISEMENT ID | TITLE | CONTENTS | ATTRIBUTE |
|---|---|---|---|---|---|---|
| 2001 | 1001 | 2014/1/1 12:00 | 4001 | **DRINK | ~ | BEVERAGE |
| 2002 | 1001 | 2014/1/1 12:30 | 4003 | M NEWLY MADE BAG | ~ | CLOTHES |
| 2003 | 1001 | 2014/1/1 17:00 | - | MY CAT ... | ~ | - |
| 2004 | 1002 | 2014/1/2 12:00 | 4001 | **DRINK | ~ | BEVERAGE |

| ADVERTISEMENT ID | ADVERTISER ID | ADVERTISEMENT IMAGE | ADVERTISEMENT TARGET | COMMODITY SPECIFYING INFORMATION | PRIVILEGE ID |
|---|---|---|---|---|---|
| 4001 | 3001 | **** | **DRINK | DRINK, CARBONATED DRINK | T4001 |
| 4002 | 3002 | **** | **DRINK | DRINK, CARBONATED DRINK | T4002 |
| 4003 | 3003 | **** | STORE | M, ON-LINE | T4003 |

(b)

| PRIVILEGE ID | ADVERTISEMENT ID | RELATED STORE | USE CONDITION | PRIVILEGE CONTENTS | DISTRIBUTION START | DISTRIBUTION TERMINATION | ATTRIBUTE NUMBER OF DISTRIBUTIONS |
|---|---|---|---|---|---|---|---|
| T4001 | 4001 | O STREET SHOP | VISIT | 15 POINTS | IMMEDIATELY | NO-LIMITATION OF PERIOD | ONCE/DAY |
| T4002 | 4002 | O STATION SHOP | VISIT | 5-POINTS PRESENT | IMMEDIATELY | 2014/12/31 | 4 |
| T4003 | 4003 | O.com | PURCHASE OF 5000 YEN OR MORE | 10%-OFF COUPON | 2014/2/1 | 2014/3/31 | NO-LIMITATION |

Fig.6

| USER ID | BROWSING TIME AND DATE | ARTICLE ID | CONTRIBUTOR ID | ADVERTISEMENT ID | CONTENTS |
|---|---|---|---|---|---|
| 1003 | 2014/1/1 13:30 | 2001 | 1001 | 4001 | FINISHED |
| 1003 | 2014/1/1 18:00 | 2003 | 1001 | - | - |
| 1002 | 2014/1/2 14:00 | 2002 | 1001 | 4003 | UNFINISHED |

Fig.7

ADVERTISEMENT INFORMATION SHARING SYSTEM

TECHNICAL FIELD

The present invention relates to an advertisement information sharing system for carrying out a contribution, browsing and advertisement utilization of an article to which an advertisement is added.

BACKGROUND ART

In accordance with the spread of the Internet, a display of an advertisement which has been carried out only on a medium that has an attracting force of customers, such as a newspaper, a magazine, an actual store or the like, before, can be carried out by anyone freely.

As a method for inserting an advertisement by using the Internet, an advertisement mode that is referred to as "affiliate marketing", which carries an advertisement image relating to a commodity of another person on a homepage of his or her own so that a reward can be obtained, has been generally known.

The affiliate marketing refers to an inserting method for an Internet advertisement in which, when a reader of the advertisement has purchased a commodity listed on the advertisement, or made a contract for purchasing a commodity listed thereon through a link that is inserted to the homepage, the administrator of the home page can accept an achievement reward.

In this case, in order to carry out an insertion of such an advertisement, normally, it is necessary to have his or her own homepage, or to manage a blog of his or her own. At this time, if there is no attracting force of customers in the contents displayed on the homepage of his or her own, the advertisement information published thereon is not effectively propagated to many people.

Moreover, in order to insert an advertisement, it is necessary to individually make a contract with an advertiser or to learn a method or the like for inserting a link. For those who want to newly display an advertisement, these jobs that form the premise of the publication become large obstacles.

Prior Art Document 1 has described a technique relating to an advertisement managing device in which an administrator of a homepage collects affiliates who want to insert an advertisement onto his or her homepage so that the affiliates are allowed to publish the advertisement.

PRIOR ART DOCUMENT

Patent Document

Patent Document 1: JP-A No. 2009-116629

DISCLOSURE OF INVENTION

Problem to be Solved by the Invention

In accordance with the invention of Patent Document 1, even the user who has not carried out the publication of an advertisement before is allowed to easily publicize an advertisement. For this reason, the publication of advertisements by the use of the Internet has been widely popularized.

However, it cannot be said that in these advertisement publishing systems, the published advertisement is sufficiently utilized. To many readers, advertisements published on the Internet are simply considered as obstacles at the time of browsing web pages, and these are not subjects that can be positively browsed by the readers themselves.

In accordance with the prior art, effects for increasing the amount of insertion of advertisements in the entire Internet and for relatively increasing the utilization of advertisements accordingly can be expected. However, such effects as to particularly enhance the interest of the readers of the advertisements and allow the readers to utilize the advertisements by further following links thereof cannot be achieved.

The present invention has been devised in view of the above-mentioned circumstance, and its object is to provide an advertisement information sharing system in which by allowing anyone to easily contribute an advertisement added article and by also presenting an advertisement that draws attention of the readers of the article, the manuscript publication of the advertisement article by the contributor and the browsing and utilization of the advertisement by the readers can be accelerated.

Means for Solving the Problem

In order to solve the above-mentioned problems, the present invention provides an advertisement information sharing system including a contributor terminal for outputting an article with an advertisement added thereto, a user terminal for outputting user information and an advertisement information sharing server.

The advertisement information sharing server records browsing history information having contributor information of an advertisement added article that is published to users having relevant information indicating connections between the contributor and a user, and browsed by the user and advertisement specifying information for specifying an advertisement added to the advertisement added article.

The advertisement information sharing server comprises a manuscript publication means which adds the advertisement information relating to the advertisement target to the article information containing the contents relating to the advertisement target inputted from the contributor terminal so as to record the resulting information as an advertisement added article; a history collation means for carrying out a collating process with the browsing history information of the user, by utilizing the advertisement specifying information inputted in association with the user information; and an addition means in which when the authentication is confirmed by the history collation means, an advertisement utilization privilege is added to the privilege information of the user and the contributor described in the browsing history information.

And the advertisement specifying information is associated with the user information in a corresponding store presented based upon the advertisement information of the target advertisement added article, and outputted to the advertisement information sharing server in association with the user information from the user terminal or a store terminal installed in the corresponding store.

Upon publishing an article, the contributor is allowed to contribute the article with an advertisement added thereto so that it becomes unnecessary to carryout time-consuming complicated jobs, such as an individual contract with an advertisement enterprise and learning of an opening method for a homepage and an inserting method of an advertisement, which have been conventionally required. Therefore, anyone can easily insert an advertisement. Moreover, by allowing contributions of users relating to a user himself or herself to be displayable, it becomes possible to browse articles of the users who belong to a community to which the user belongs, or have similar tastes in commodities, and those commodities suitable for his or her tastes can be obtained as advertised commodities to be inserted. For this reason, the effect for accelerating the utilization of the advertisement can be obtained.

In accordance with a preferred mode of the present invention, the advertisement information sharing server is characterized by recording browsing history information having contributor's information of an advertisement added article browsed by the user and advertisement specifying information for specifying the corresponding advertisement, and it is also provided with a history collating means for collating inputted collation user's information and the advertisement specifying information with the browsing history information of the collation user, and an addition means which in the case when the authentication is given by the history collation means, adds an advertisement utilization privilege to the privilege information of the collation user and the contributor described in the browsing history information.

By allowing the readers to utilize the advertisement, it becomes possible to insert an advertisement that is beneficial to both of the contributor of an advertisement added article and the readers thereof, and even in the case of inserted advertisements that have not yet drawn attention of many readers, the effects for drawing more attention to the contents thereof and for encouraging the utilization of the advertisement can be expected. Since by the utilization of the advertisement, the readers of the advertisement added article are allowed to have its privilege added to himself or herself, the readers become to more positively utilize the advertisement, for example, in purchasing and ordering a commodity introduced by the advertisement. Accordingly, since the utilization rate of the advertisement by the readers is raised, the effect for allowing the contributors of articles to more positively insert advertisements by actively utilizing the present system can be expected.

In accordance with a preferred mode of the present invention, the advertisement information sharing server is characterized by recording the advertisement usability of each of the users, and based upon the advertisement usability, it determines the display method of the advertisement in an article.

Since the degree of interest and the degree of utilization of the advertisement are different depending on each of the users, by carrying out an advertisement display suitable for each user, the effect of further enhancing the advertisement utilization by the users can be expected. For example, to a user who is highly interested in advertisements, a related advertisement and an advertisement added article are additionally presented, while to a user who is not so interested therein, the advertisement is displayed with a privilege portion being emphasized; thus, it becomes possible to further encourage the utilization of the advertisement.

In accordance with a preferred mode of the present invention, the advertisement information sharing server is characterized by including a privilege delivery means that delivers a privilege added by the addition means to the user at a desired timing so as to be utilized.

By making the added privilege usable by the user at a desired timing, the advertiser becomes to utilize the advertisement and its privilege more strategically.

In accordance with a preferred mode of the present invention, the advertisement information is characterized by including positional information of a store and a recommendation means which selects an advertisement information or an advertisement added article relating to stores located on the periphery at a desired point on a map specified by the user terminal, and recommends the contribution of the advertisement added article or the browsing thereof.

By encouraging the contribution of the advertisement added article and browsing thereof by using the positional information, it becomes possible to encourage the user who comes close to a store to contribute an article, to browse the site and utilize the advertisement. For example, to a user who wants to have a meal, by presenting advertisement added articles of neighboring restaurants, both of the effects of browsing the article and utilization of the advertisement can be expected. Moreover, after the meal, the contribution of the advertisement added article including reviews of the restaurant can be expected. In addition to the positional information, user information, such as profiles, and contribution and browsing recommendations based upon time and periods may be given.

In accordance with a preferred mode of the present invention, the addition means is characterized by adding a contribution privilege to the privilege information of the contributor who has used the script publishing function.

By contributing an article with an advertisement added thereto, a privilege is added to the contributor so that the contribution of the article with the advertisement added thereto can be progressively carried out.

In accordance with a preferred mode of the present invention, the addition means is characterized by adding a browsing privilege to the privilege information of the reader who has browsed the advertisement added article.

Since a privilege can be added to the reader who has browsed the article with the advertisement added thereto, it is possible to accelerate the browsing of the advertisement. Therefore, the user becomes to positively browse the advertisement.

In accordance with a preferred mode of the present invention, the advertisement information sharing server is characterized by forming an advertisement for the user himself or herself so as to be published.

Since the user himself or herself is allowed to form an advertisement and to publish the advertisement, commodities can be sold or the like by the user himself or herself.

In accordance with a preferred mode of the present invention, the advertisement information sharing server is characterized by including an article information analysis means for analyzing article information inputted from the user terminal so as to acquire target specifying information indicating an advertisement target described in the article.

By analyzing the article information to specify the advertisement target, it becomes possible to effectively provide information demanded by the user, in the case when an article is displayed based upon the user's retrieval or the like.

In accordance with a preferred mode of the present invention, the article information analysis means is characterized by including a warning means that gives a warning to a contributor when an inputted article information includes a contribution non-recommendation subject such as personal information or the like.

In this manner, by mechanically giving a warning by the analysis, an effect for preventing information from flowing out without the intention of the user can be expected. Moreover, it becomes possible to prevent a malicious contribution to an advertisement store and to allow the user to provide high-quality articles.

In accordance with a preferred mode of the present invention, the advertisement information sharing server is characterized by including an automatic addition means which automatically adds an advertisement to a recorded article by using the target specifying information and records the resulting data as an advertisement added article.

In this manner, by automatically adding an advertisement of a sponsor enterprise that has not been incorporated at the time of the contribution of an article, not only an article having a commodity relating to the advertisement, but also an article relating to many commodities having no advertisements can be contributed so that the activation of the entire information sharing system can be expected. Accordingly, an effect for enhancing the advertisement contribution and browsing as well as the advertisement utilization can be expected.

In accordance with a preferred mode of the present invention, the advertisement information sharing server is characterized by including an advertisement presentation means for selecting advertisement information to be added to article information inputted from a user terminal by using the object specifying information and presenting the resulting information to the contributor in a manner so as to be selectable.

Thus, the user is allowed to easily draw an advertisement suitable for the article and makes it possible to activate the contribution of the advertisement added article.

In accordance with a preferred mode of the present invention, the advertisement information sharing server is characterized by including an advertisement collation means for carrying out a collation process on a relationship between the inputted article information and advertisement information added to the article information by using the target specifying information.

By inspecting a relationship between the inputted article contents and an advertisement added thereto, it becomes possible to encourage a contribution of an article that is suitable for the contents of the advertisement, and consequently to provide an advertisement added article having higher quality contents including reviews and explanations about a commodity to the user.

The present invention provides an advertisement information sharing server that records browsing history information having advertisement specifying information for specifying contributor information of an advertisement added article that is published to users having relevant information indicating connections between the contributor and mutual users, and browsed by the users and an advertisement added to the advertisement added article, and is provided with a manuscript publication means which adds the advertisement information relating to the advertisement target to the article information containing the contents relating to the advertisement target inputted from the contributor terminal and records the resulting information as an advertisement added article, a history collation means for carrying out a collating process with the browsing history information of the user, by utilizing the advertisement specifying information inputted in association with the user information; and an addition means in which when the authentication is confirmed by the history collation means, an advertisement utilization privilege is added to the privilege information of the user and the contributor described in the browsing history information, and in these means, the advertisement specifying information is characterized by being associated with the user information in a corresponding store presented based upon the advertisement information of the target advertisement added article, and inputted in association with the user information from the user terminal or a store terminal installed in the corresponding store.

The present invention provides a method for sharing advertisement information comprising the steps of: recording browsing history information having advertisement specifying information that is published to users having relevant information indicating connections between a contributor and mutual users, and specifies contributor information of the advertisement added article browsed by the users and the advertisement added to the advertisement added article; a step of adding the advertisement information relating to the advertisement target to the article information containing the contents relating to the advertisement target and of recording the information as the advertisement added article; a step of carrying out a collating process with the browsing history information of the user, by utilizing the advertisement specifying information inputted in association with the user information; and a step in which when the authentication is confirmed by the history collation means, an advertisement utilization privilege is added to the privilege information of the user and the contributor described in the browsing history information, and in these steps, the advertisement specifying information is associated with the user information in a corresponding store presented based upon the advertisement information of the target advertisement added article, and inputted in association with the user information from the user terminal or a store terminal installed in the corresponding store.

Effect of the Invention

In accordance with the present invention, by allowing anybody to easily contribute an advertisement added article so as to execute an advertisement presentation that draws attention of the readers of the article, it is possible to provide an advertisement information sharing system that can further encourage contribution of an advertisement added article by the contributor and browsing and utilization of the advertisement by the readers.

BRIEF DESCRIPTION OF DRAWINGS

FIG. 4 shows a structural example of a user data base in accordance with embodiment 1 of the present invention.

FIG. 5 shows a structural example of an article information data base in accordance with embodiment 1 of the present invention.

FIG. 6 shows a structural example of an advertisement information data base in accordance with embodiment 1 of the present invention.

FIG. 7 shows a structural example of a browsing history information data base in accordance with embodiment 1 of the present invention.

BEST MODE FOR CARRYING OUT THE INVENTION

Referring to FIGS. 1 to 11, the following description will explain embodiments of the present invention.

Embodiment 1

The present invention relates to an information sharing system that provides a function for contributing an article and a function for browsing the contributed article to each of the users.

Thus, the browsable article is an article of another user having a relevant factor between the user and the corresponding user, or an article retrieved by the user. The relevant factor refers to a link for use in forming the network, and represents a connection between users that is capable of being desirably determined by the connection in the actual world and a relationship between users that might be determined by the user desirably. Moreover, the present invention also relates to an advertisement information sharing system that adds an advertisement to an article to be contributed and contributes the article as an advertisement added article.

The outline of the entire system in the present embodiment will be explained.

First, referring to FIGS. 1 to 7, the entire configuration corresponding to all the embodiments will be explained, and thereafter, the explanation of each of the embodiments will be explained in detail.

Figure 1:
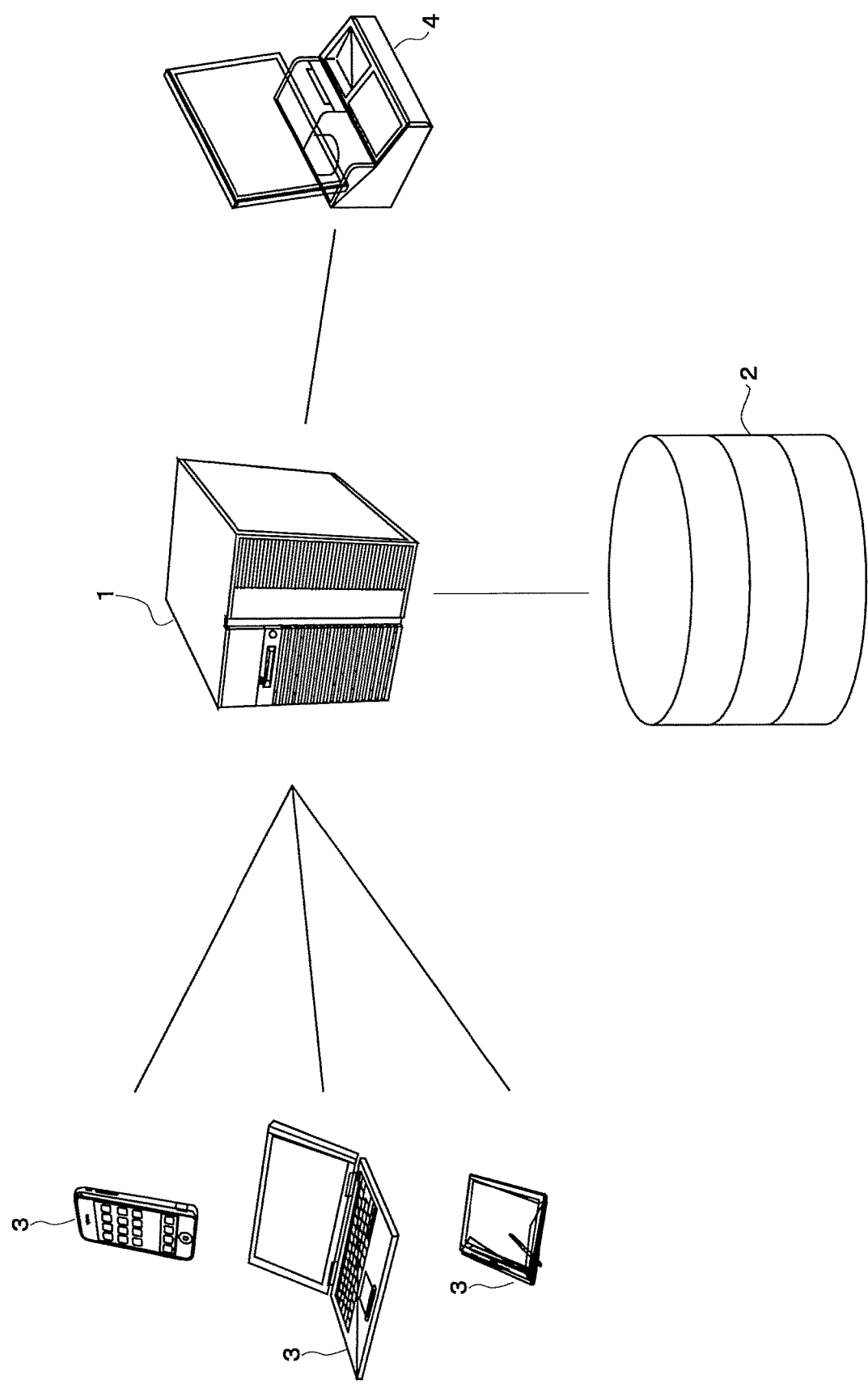
FIG. 1 shows a structural example of an information sharing system in accordance with embodiment 1 of the present invention.

FIG. 1 shows an advertisement information sharing system in accordance with embodiment 1 of the present invention. Reference numeral 1 represents an advertisement information sharing server, reference numeral 2 represents a storage unit, reference numeral 3 represents a user terminal, and reference numeral 4 represents a store terminal. The storage unit 2 may be installed as an integral unit together with the advertisement information sharing server 1.

Figure 2:
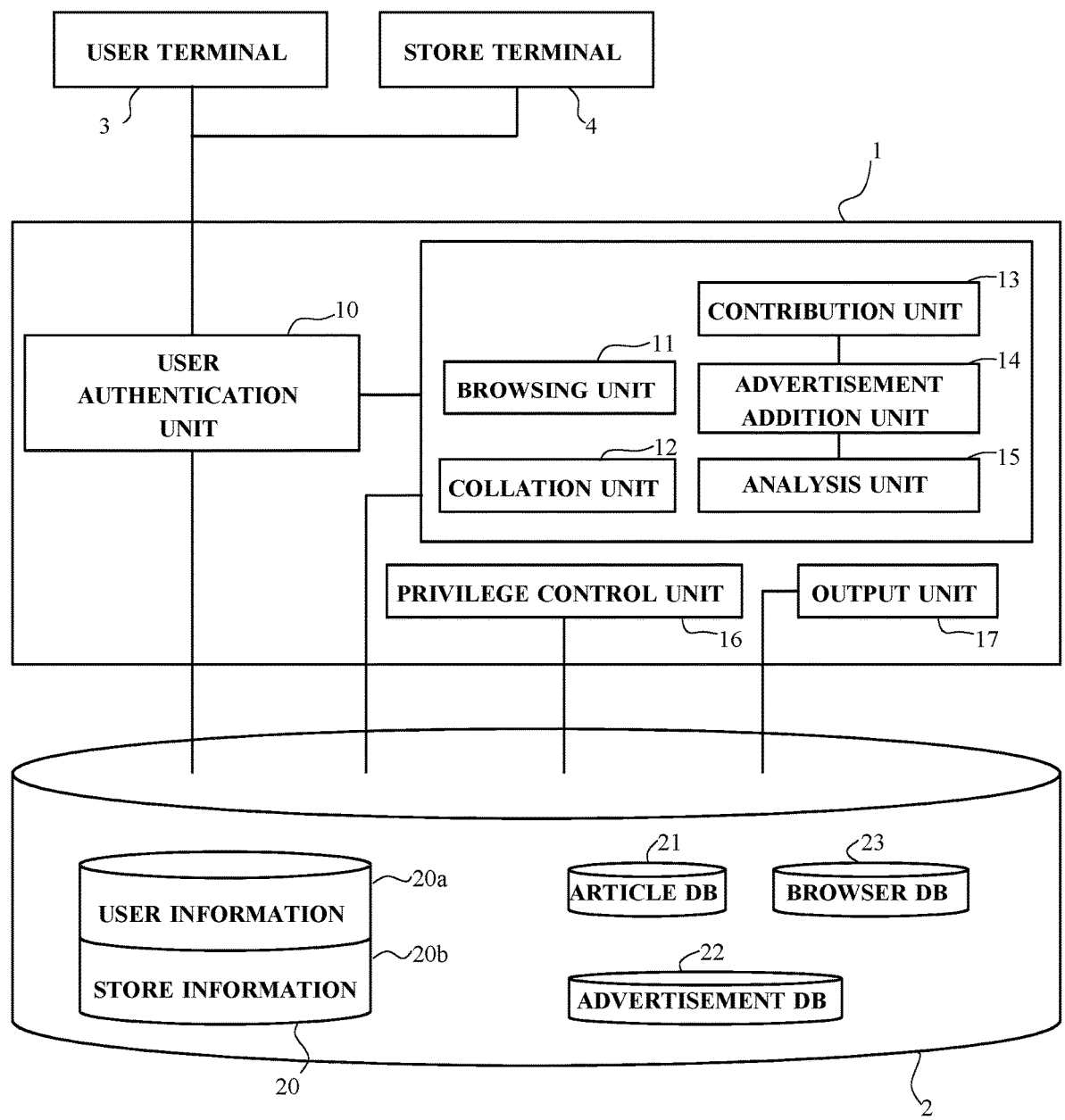
FIG. 2 is a functional block diagram relating to the structural example of the information sharing system in accordance with embodiment 1 of the present invention.

As shown in FIG. 2, the advertisement information sharing server 1 is a server device that can be accessed from a plurality of user terminals 3 through the Internet and provide an advertisement information shared service, and as shown in FIG. 2, it is provided with a user authentication unit 10, a browsing unit 11, a collation unit 12, a contribution unit 13, an advertisement addition unit 14, an analysis unit 15, a privilege control unit 16 and an output unit 17.

From the user terminal 3, functions supplied by the browsing unit 11, the collation unit 12, the contribution unit 13 and the advertisement addition unit 14 are utilized, and the log-in process is carried out by the user authentication unit 10 so as to utilize those functions. The authentication job by the user authentication unit 10 is not necessarily required to be carried out, and those functions may be made usable by giving limitations, that is, for example, no receiving action except for a contribution of an article to be described later and a privilege in the coupon medium is accepted. Moreover, the same operations as those of the user terminal 3 may be carried from the store terminal 4.

Figure 3:
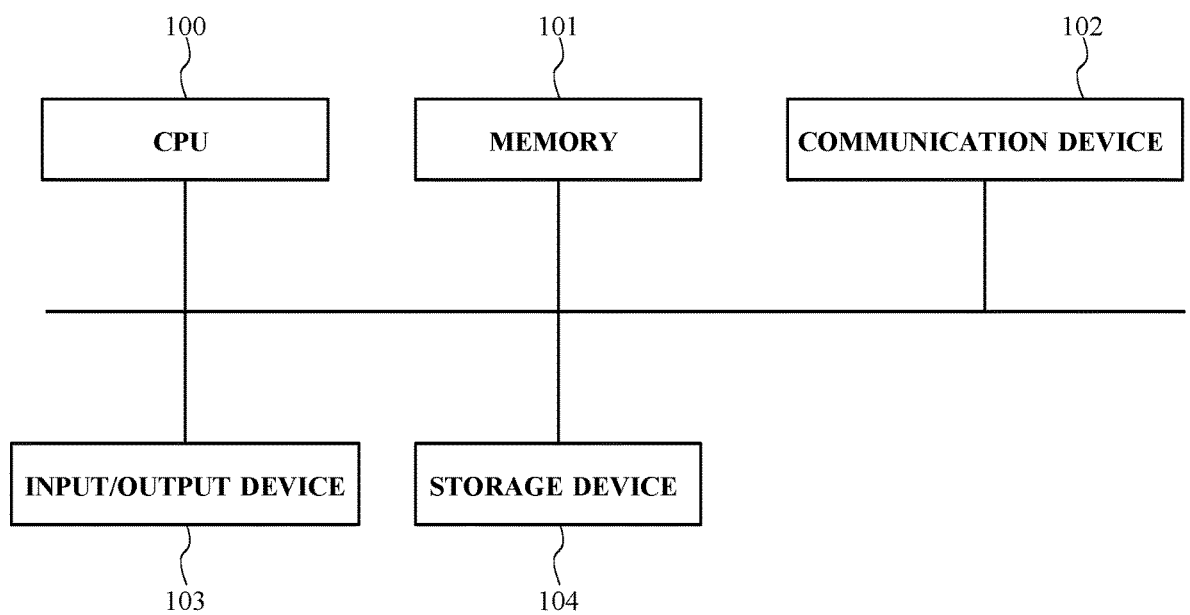
FIG. 3 shows a hardware structural example of an information sharing server in accordance with embodiment 1 of the present invention.

FIG. 3 shows a hardware configuration of the advertisement information sharing server 1. The information sharing server 1 is provided with a CPU 100, a memory 101, a communication device 102 for use in communication through a network, an input/output device 103 for use in displaying the server operation and result, and a storage device 104. The storage device 104 has an advertisement information sharing program recorded therein so that the main functions of the advertisement information sharing system are thus provided.

The user authentication unit 10 allows each of the users to log-in by using a log-in ID/log-in password that is a character string recorded in the user information table 20a and only informed to the user, or a number inherent to the terminal, and supplies services and web pages that are operable within the preliminarily determined user authority. The authentication job by the user authentication unit 10 is not necessarily required to be carried out, and those services may be made usable by giving limitations, that is, for example, no receiving action except for a contribution of an article to be described later and a privilege in the coupon medium is accepted.

Upon receipt of a browsing request inputted from the user terminal 3, the browsing unit 11 outputs the corresponding article/advertisement added article recorded in the article data base 21 to the user terminal 3 that is the input source so as to be browsed. The user terminal 3 is allowed to browse the outputted article/advertisement added article on the web browser. The user who has given the browsing request may be confirmed as to whether or not he or she has the browsing authority, and only when the user has the authority, the output may be carried out.

The collation unit 12 is a section in which the user utilizes an advertisement and is subjected to an authentication at the time of obtaining its privilege. User information and advertisement specifying information inputted to the collation unit 12 from the user terminal 3, the store terminal 4 or the like are collated with browsing history information recorded in the browsing data base 23, and by using the combination inputted thereto, it is determined whether or not the user is authenticated for using the privilege. The advertisement specifying information in the present embodiment uses an advertisement ID capable of uniquely specifying the target advertisement, as will be described later. Since the advertisement ID is associated with many other pieces of information and is difficult to be altered, the advertisement specifying information may be prepared separately from the advertisement ID. By preparing the advertisement specifying information separately so as to be altered, it is possible to desirably improve the effect for preventing an unfair advertisement utilization.

The advertisement specifying information is issued to the user at a timing preliminarily determined by the advertiser, such as a timing when the user visits an actual store or when the user purchased a commodity in the actual store, or a timing when the user has reserved a commodity on the Internet site. The timing is desirably published to the user preliminarily. Moreover, as the method for issuing, methods in which a clerk in the store manually inputs through the user terminal 3, or presents the corresponding barcode so as to be readable by the user terminal 3, or carries out a delivery by using a non-contact IC or a high frequency signal are proposed. Of course, another method other than these may be used.

The collation unit 12, which has received user information and advertisement specifying information, acquires the user's browsing history information by using the user information, and in the case when a record corresponding to the advertisement specifying information is stored therein, the collation is authenticated. By determining an advertisement insertion cost by the advertisement information sharing system as a piece-rate system, while charging and adding the advertisement insertion costs at the time of a collation, an advertisement utilization, a distribution of privilege to be described later, or the like, the effects and costs of the insertion can be desirably presented clearly to the advertiser.

The contribution unit 13 adds postscript information relating to contribution, such as an article ID, contribution time or the like to the inputted article information, and records the resulting information in the article data base 21 as an article and/or an advertisement added article. The article information indicates character information, such as a title of an article and a text thereof, and an added matter, such as images, moving images and sound source. The publication limit and the browsing authority may be given thereto so as to prevent specific users from browsing the article/advertisement added article.

The advertisement addition unit 14 carries out the addition of an advertisement to the article information contributed to the contribution unit 13 or the article recorded in the article data base 21. The contributor can desirably add advertisement information to the article so as to be recorded as an advertisement added article.

A function may be prepared in which based upon the positional information of the user terminal 3 and profile information, such as hometown and life history of the user, the user is recommended to contribute an advertisement added article relating to facilities and commodities that are considered to have been utilized by the user. Moreover, another function may be prepared in which from the inputted article information, an advertisement suitable for the article information is presented.

Moreover, functions for acquiring the positional information of the user terminal 3 and for recommending the browsing and contribution of an advertisement added article relating to stores and facilities on the periphery of the user terminal may be prepared. By using this arrangement, it becomes possible to encourage the user to use the peripheral stores and to carry out browsing and contribution of advertisements. The advertisement stores presented in this case may be calculated based upon user's information, such as user's tastes, profiles or the like, as well as time and period. By using this arrangement, it is possible to obtain an effect for avoiding the presentation of an unnecessary advertisement to the target user.

In the case when a user who contributes an advertisement added article is a store user capable of logging in from the store server 4, to the privilege (utilization privilege and browsing privilege) of the advertisement added to the contribution, the coupon of the store itself may be added. With this arrangement, not among users but among stores, contributions of advertisement added articles are carried out so that an effect for accelerating the contributions of advertisement added articles can be expected.

The analysis unit 15 analyses article information, and provides various functions to the user based upon the results of analysis. For example, such functions includes to present a commodity advertisement suitable for the article information inputted by a user to the user so as to reduce jobs for finding out advertisements suitable for the article information, or with respect to an article about a certain commodity which has no sponsor at the time of its contribution so that no added advertisement is available, after the commodity starts to have a partnership with a sponsor, to automatically add the advertisement to the article. Moreover, by analyzing article information, provision may be made so that a warning against an inappropriate article information is given, or such an article is excluded.

The privilege control unit 16 carries out control so as to add a privilege to the user information and distribute the added privilege to the user so as to be usable. The privilege more specifically refers to points, coupons or the like to be utilized in a point service. Actions relating to the privilege addition include actions at the time of browsing of, or contributing to privilege utilization or advertisement added article, and its timing is desirably determined by the system administrator or the advertiser. The timing of the privilege addition by the advertisement utilization refers to a time when the user visits a store or a time when the user purchases the subject commodity, and can be controlled by a distribution timing of advertisement specifying information required for carrying out the collation.

In the case when a privilege is added up to the user, this fact may be immediately distributed to the user so as to be usable, or in a desired timing after the addition, this fact may be distributed to the user so as to be usable. Moreover, the usable period of time may be determined by the advertiser so that a more strategic advertisement insertion can be obtained. The addition of the same privilege to the user may be limited to once, or once a day, or the like.

The output unit 17 carries out an output relating to a browsing request given to the browser unit 11, and also outputs collation results with respect to the collation unit 12, a presentation of an advertisement to be added to article information by the analysis unit 15, and addition and distribution information or the like of privilege by the privilege control unit 16 or the like to the user terminal 3 and the store terminal. To the store terminal 4, the browsing history and statistical information or the like of an advertisement can be supplied.

The storage unit 2 is provided with a user data base 20 having user information 20a and store information 20b, an article data base 21, an article data base 21, an advertisement data base 22 and a browsing data base 23. The data recorded in the storage unit 2 are exemplary only in the present embodiment, and it is not intended to be limited by the data contents and recording places. These data may be recorded in the advertisement information sharing server 1, or may be recorded in a separated manner.

As shown in FIG. 4, the user data base 20 is provided with the user information 20a in which profile information such as a user ID and a user name of each of the users, log-in information such as a log-in ID/password or the like, privilege information, relevance information with the other users, etc. are recorded, and store information 20b in which profile information relating to a store ID that is a user ID of the store whose advertisement is inserted, and the name and address of each of stores, as well as log-in information or the like, are recorded. These pieces of information are used upon logging in the service by using the user authentication unit 10 or upon managing the contribution and the browsing history, etc. so that an individual web page and service can be supplied to each of the users.

As shown in FIG. 5, the article data base 21 records an article contributed by the user, an article ID that is capable of uniquely determining an advertisement added article, the contributor ID thereof, the time and date of the contribution, and the advertisement ID attached to the advertisement added article, etc. in association with one another. Upon receiving a browsing request to the browser unit 11 from a user terminal 3, the corresponding article information is outputted by the output unit 17 so as to be browsed on the above-mentioned user terminal 3.

The advertisement data base 22 records advertisement information including a table relating to advertisements on which, as shown in FIG. 6(*a*), an advertisement ID corresponding to advertisement specifying information in the present embodiment, a user ID of an advertiser who has published an advertisement, information of an advertisement image, commodity identifying information for use in drawing an advertisement through a retrieving process, etc. are recorded, and a table relating to privilege on which, as shown in FIG. 6(*b*), a privilege ID and a corresponding advertisement ID, a distribution period for the privilege, and utilization conditions of the advertisement, etc. are recorded. Upon presenting the advertisement information added by the advertisement addition unit 14 to the user terminal 3, or upon giving a browsing request relating to an article with an advertisement added thereto by the browsing unit 11, the advertisement information is outputted by the output unit 16 so as to allow the user terminal 3 to brows. In the present embodiment, the advertisement ID is used as the advertisement specifying information; however, the advertisement specifying information may be prepared in a separated manner. By preparing the advertisement specifying information separately, it becomes possible to easily alter the advertisement specifying information, and consequently to obtain an effect for preventing unfair advertisement utilization.

As shown in FIG. 7, the browsing data base 23 has an article ID of an article browsed by the user, a user ID of the contributor thereof, an advertisement ID corresponding to advertisement specifying information of an advertisement added thereto, and browsing information having information or the like relating to the receiving history of privileges recorded thereon for each of the users. The above-mentioned browsing history information is collated upon utilizing the collation means by the collation unit 14. The contents of the history may be outputted so as to allow each of the users to confirm the browsing history.

The configuration of information and table described in these data bases is one example in the present embodiment, and may be managed in association with another table.

The user terminal 3 is connected to the advertisement information sharing server 1 through the network, and a browsing request and a contribution request, as well as a collation request or the like are inputted by the user, and the processing result by the advertisement information sharing server 1 is outputted. The user terminal 3 is constituted by a portable terminal, a computer, etc.

The store terminal 4 is connected to the advertisement information sharing server 1 through the network. The collation by using the collation unit 14 may be designed so as to be carried out from a store terminal provided in an actual store or the like. Moreover, in the same manner as in the user terminal 3, the contribution of an article and the browsing process may be carried out by using an account of his or her own. Furthermore, in the case when a store user contributes an advertisement added article, an advertisement of himself or herself may be added together therewith, or an advertisement utilization privilege (coupon or the like) of his or her own may be simultaneously calculated and added.

Figure 8:
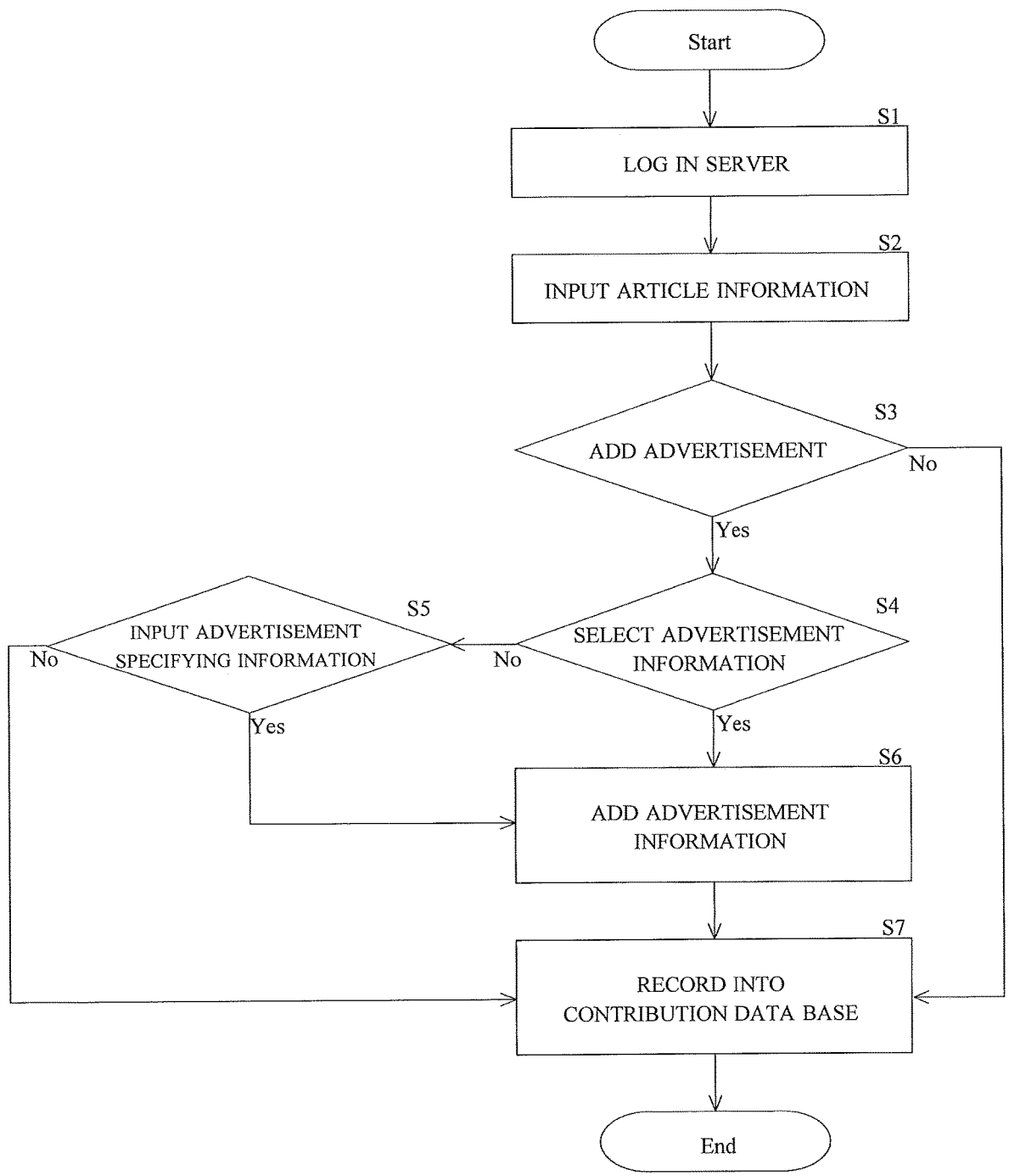
FIG. 8 shows a flowchart of an article contribution in accordance with embodiment 1 of the present invention.

Next, referring to FIG. 8, the following description will explain the contribution of an article in the advertisement information sharing system in the present embodiment.

The user first logs in the advertisement information sharing server 1 by using the user terminal 3, and based upon his or her authority, obtains an output of an operable home page (hereinafter, referred to as his or her own page) (S1). This his or her own page allows the user to carry out jobs in the general information shared service, such as to brows at least articles about which the user has the authority to brows, to contribute an article and to manage or the like relevance information with the other users.

By using a contribution form on his or her own page, the user inputs article information, such as a title of an article to be desirably contributed and a text of the article (S2). In this case, attached subjects such as photographs and moving pictures as well as sound sources may also be inputted as the article information. Moreover, in this case, it is desirably designed to make corrections on the past article and to add attaching subjects at any time from his or her own page.

In this case, the advertisement information sharing server 1 allows the user corresponding to the contributor to determine whether or not an advertisement should be inserted to the article (S3). In the case when no advertisement is inserted (NO in S3), the inputted article information is recorded as an article having no advertisement in the article data base (S7). In the case when an advertisement is inserted (YES in S3), the sequence proceeds to S4.

Upon inserting an advertisement, among pieces of advertisement information recorded in the advertisement data base 22, advertisement information that is suitably added to the article information is presented to the user by the advertisement presentation means provided by the advertisement addition unit 14 and the analysis unit 15 (S4). The advertisement information that is presented at this time is selected based upon commodity specifying information corresponding to a keyword obtained from the inputted article information, combined data of article information in the past advertisement added article and the corresponding advertisement, or the like. In this case, some candidates are presented to the user, and among them, an advertisement that is coincident therewith may be selected by the user. Moreover, even when there are advertisements relating to the same subject, different privilege contents and acquiring conditions may be selected.

In the case when advertisement information that is made coincident with the contents of the article (YES in S4) is drawn and presented by the advertisement presentation means, the resulting information is selected and added to the article information (S6). In the case when no advertisement whose contents are coincident with the article contents is drawn, the advertisement information to be added may be retrieved by using commodity specifying information inputted by the contributor (S5). If the advertisement information has been drawn (YES in S5), the advertisement information is added to the article information (S6). Even in this process, when the advertisement information that is made coincident with the article contents is not drawn or when the advertisement addition is cancelled (NO in S5), the article is recorded in the article data base as a normal article without the addition of an advertisement (S7), and the contribution job of the article is terminated.

After addition of advertisement information to the article information in S6, the resulting information is recorded in the article data base 21 as an advertisement added article (S7).

In accordance with the present embodiment, the user is allowed to freely carry out a contribution of an advertisement added article easily. Thus, without the necessity of opening of an individual home page, learning as to how to insert an affiliate advertisement, individual contracts or the like with an advertising company or the like that have been required in the past, it becomes possible to easily carryout the advertisement publication easily. For this reason, the advertisement publication by individual persons can be generally carried out and the effect for accelerating the advertisement publication can be expected.

Since the user is allowed to simultaneously view the contribution made by an individual person and the advertisement, it is possible to allow the user to review the advertised commodity and also to provide an information sharing system that mainly carries out information exchange to the user.

Moreover, by installing an advertisement presentation means for automatically selecting an advertisement suitable for an article, the load of the user required for selecting an advertisement can be reduced and the user is allowed to easily contribute an advertisement added article. The advertisement presentation means is not necessarily required to be installed. However, in the case when no advertisement presentation means is installed, since the contributor needs to carry out jobs for selecting a target advertisement among a large number of advertisements, this case is not so preferable.

Embodiment 2

Figure 9:
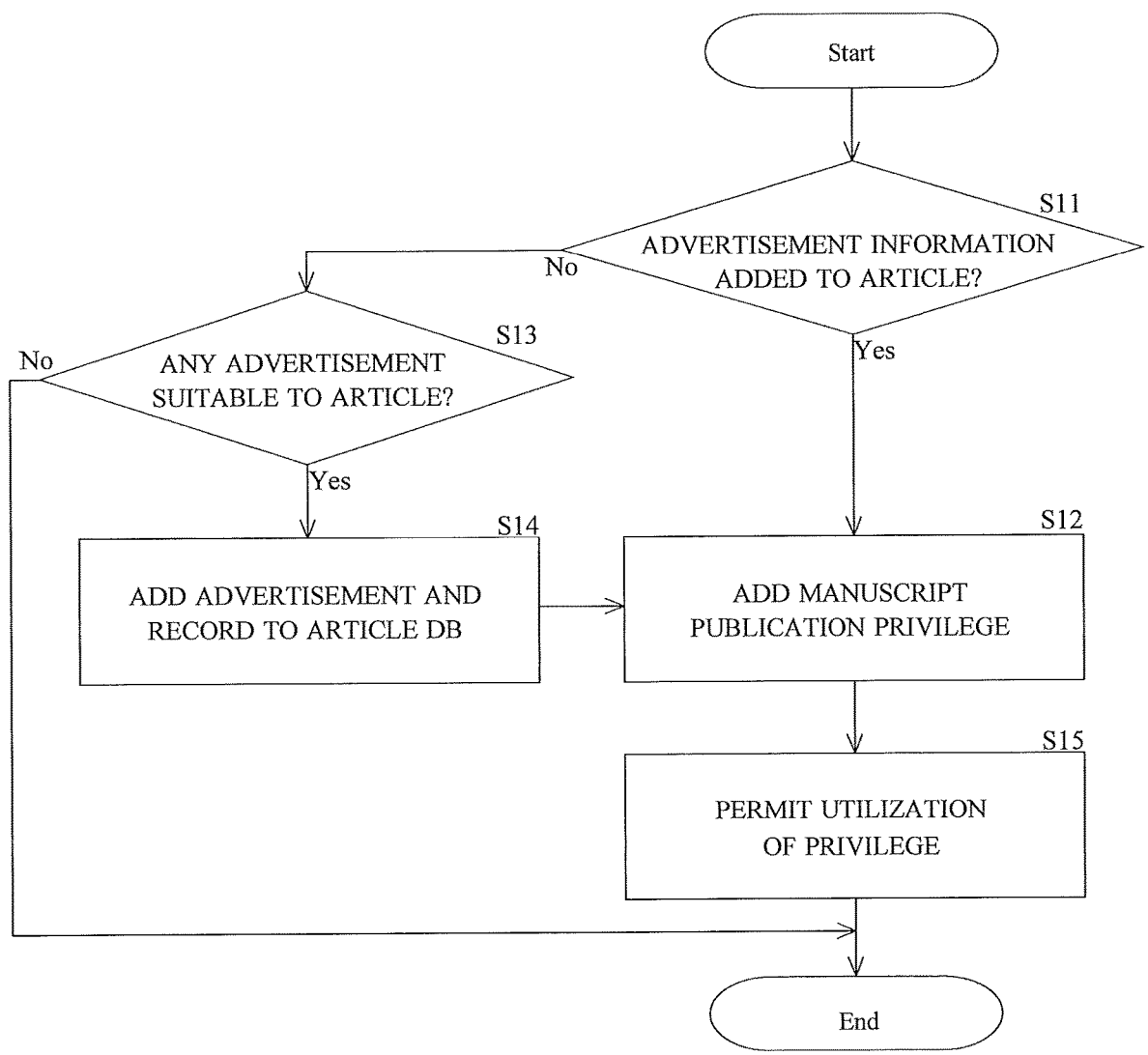
FIG. 9 shows a flowchart of a contribution privilege addition in accordance with embodiment 2 of the present invention.

Referring to FIG. 9, the following description will explain an acquiring process of a contribution privilege of an advertisement in accordance with the present embodiment. Additionally, in embodiment 2, those constituent elements that are the same as those of the aforementioned embodiment are indicated by the same reference numerals, and the description thereof is simplified.

The embodiment 2 relates to a job on the advertisement information sharing server 1 after the contribution of an article in embodiment 1. In S11, it is determined whether or not an advertisement is added to the article. In the case of the article recorded in the article data base 21 with an advertisement added thereto (YES in S11), the user (contributor) who has given the contribution is allowed to have an added privilege to the privilege information by the privilege control unit 16 (S12). In this case, the privilege refers to a point in a point service system, a coupon or the like relating to commodities provided by the advertiser.

In the case of an article recorded in the article data base 21 with no advertisement added thereto (NO in S8), advertisement information suitable for the article is drawn by the analysis unit 15, and added thereto (S13). Thus, even in the case when no advertisement suitable for the article information is present at the time of the contribution of the article, upon registering an advertisement suitable for the article information, the advertisement is added to an article suitable for the advertisement. The drawing process of the advertisement by the analysis unit 15 is carried out by using the article information of the article and the commodity specifying information relating to the advertisement.

In the case when an advertisement suitable for the article is newly added thereto (YES in S13), the article with the advertisement added thereto is allowed to form an advertisement added article and recorded in the data base (S14). When no advertisement suitable for the article is added (NO in S13), the sequence is terminated without the addition of any advertisement.

To the contributor of the article with an advertisement newly added thereto and recorded in S14, a contribution privilege of the advertisement is added (S12). The user with the privilege additionally given is allowed to utilize the privilege during a utilization available period determined by the advertiser (S15).

The utilization available period of the privilege may be started immediately after the addition of the privilege, or may be made available after a lapse of a fixed period of time. These are desirably determined preliminarily, and may be made confirmable by the contributor upon addition of an advertisement.

In accordance with the present embodiment, since an advertisement is additionally attached to a contributed article, the user is allowed to obtain a privilege. Since the privilege can be obtained by a contribution, the user can expect to have an effect for positively publishing an advertisement added article and a higher propagation of the advertisement contents. To the addition point of the contribution privilege relating to the same advertisement, the limitation of the number of times may be determined.

Embodiment 3

Figure 10:
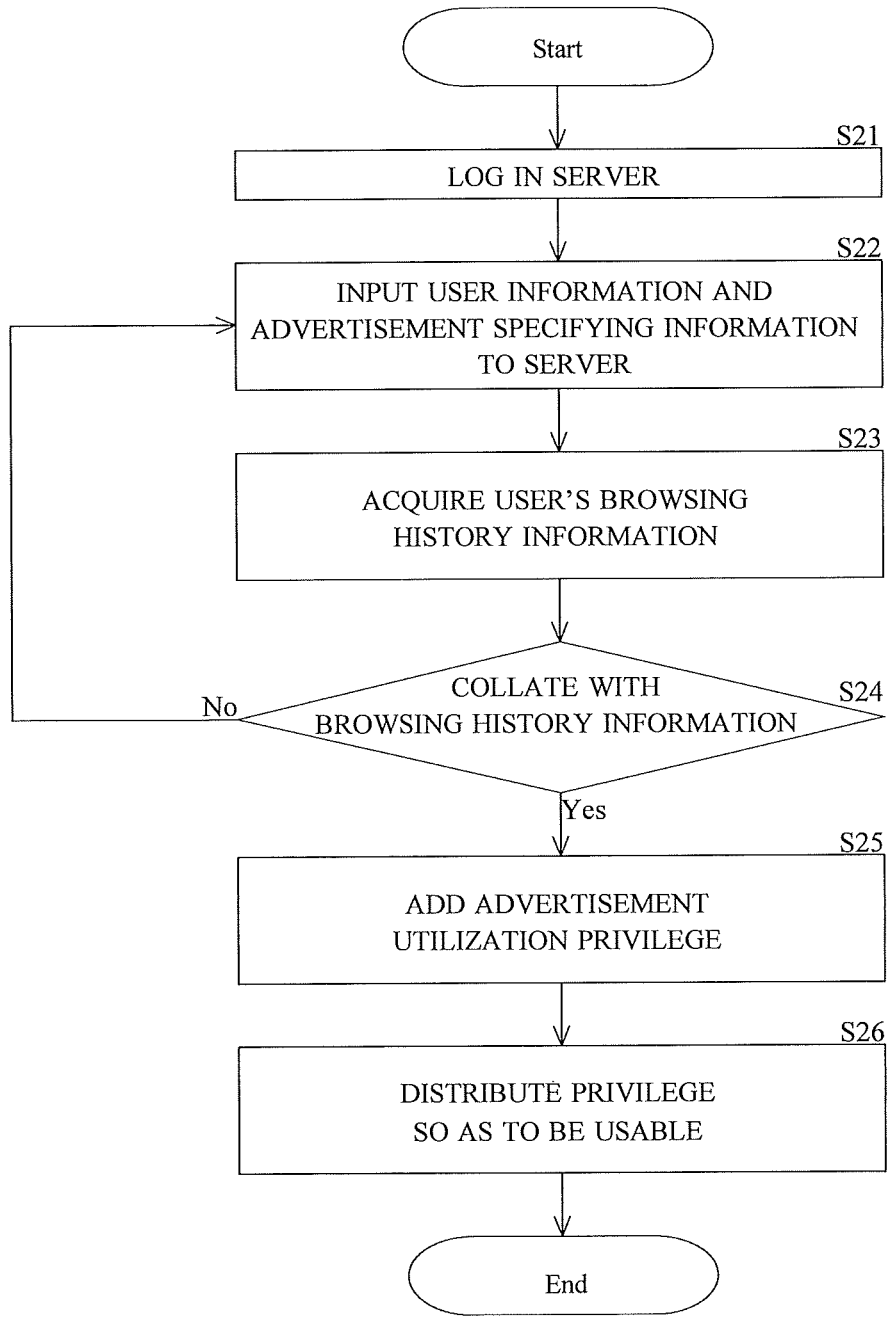
FIG. 10 shows a flowchart of an advertisement utilization privilege addition in accordance with embodiment 3 of the present invention.

Referring to FIG. 10, the following description will explain an acquiring method for a utilization privilege of an advertisement in the present embodiment. Additionally, in embodiment 2, those constituent elements that are basically the same as those of embodiment 1 are indicated by the same reference numerals, and the description thereof will be simplified.

First, the user logs in the advertisement information sharing server 1 by using the user terminal 3 of himself or herself, and obtains an output of his or her own page (S21). This log-in process is not necessarily required, and the collation may be executed without the log-in process. Moreover, advertisement specifying information for use in carrying out the collation is inputted to a collation form (S22). This form allows the user to carry out the collation (hereinafter, referred to as a collation utilizing person) to input the user information (hereinafter, referred to as collation utilizing person information) to the advertisement information sharing server 1 in combination with the advertisement specifying information.

The advertisement specifying information to be inputted in this case refers to information for allowing the user to specify an object advertisement, which can be obtained at a predetermined timing. For example, after purchasing a commodity in an actual store described in the advertisement information, the information is given to the user, or issued when the user has pre-ordered a commodity inserted in the advertisement information through a Web site.

In the present embodiment, the input of information for use in collation is carried out by the user terminal 3; however, the input of the collation user information and advertisement specifying information may be carried out by a store terminal 4 prepared in an actual store or the like. As the input method for the advertisement specifying information, in addition to the input of the user who is the collation user himself or herself or the code input to the terminal by a store clerk of the advertisement store, a reading operation by barcodes using an image capturing unit of the user terminal 3, a method for use in a non-contact IC, a method for utilizing a high-frequency signal using a sound collecting unit or the like may also be used.

The advertisement information sharing server 1, which has received the collation user information and the advertisement specifying information, draws and obtains the browsing history information of its collation user from the browsing data base 23 (S33). In the browsing history information, at least the contributor information and advertisement specifying information relating to the advertisement added article that have been browsed by the user are described.

By using the collation unit 12, advertisement specifying information inputted to the user terminal 3 is collated with advertisement specifying information described in the browsing history information acquired in step S13. In the case when these pieces of information are the same, the authentication can be obtained (YES in S24). If no authentication can be obtained (NO in S24), the advertisement specifying information is re-inputted in S22. The result of the collation is outputted to the user terminal 3 of the collation user by the output unit 17.

In the case when the authentication is obtained, the privilege control unit 16 adds an advertisement utilization privilege to the privilege information of the collation utilization person and the contributor of the advertisement added article whose advertisement has been utilized (S25).

The privilege control unit 16, which records and controls the user's privilege information, is designed such that by the end of a predetermined period, the privilege that has been added and increased to the corresponding user is distributed in a manner so as to be used by the corresponding user (S26). For example, during a campaign period, points are counted and added by the privilege utilization, and at the time of the termination of the campaign, privileges obtained by the user during the campaign period can be distributed in a manner so as to be used. The usable period or the like of the points may be freely determined by the advertiser. For example, immediately after the addition of the privilege, the utilization thereof may be started, or the utilization thereof may be limited to a fixed period of time, or may be started after the end of a termination of a fixed period.

The present embodiment is designed such that even those users who have not received privileges by the utilization of advertisements can receive such privileges. Therefore, the advertisement utilization by even those readers of articles who have been passive in the utilization can be more activated. Since benefits to the contributors are more enhanced by activating the advertisement utilization of the readers, the effect for more positively contributing advertisement added articles can be expected. As described above, an advertisement contribution and utilization cycle that are beneficial to all the three parties, that is, the user of advertisements, the contributor and the advertiser thereof, can be formed.

Moreover, in the information sharing service, those users having mutual relational factors tend to have some relationships such as hobbies, ages, areas, life environments, etc., in the actual life as well as in the tastes in many cases. Depending on deviations of user's characteristics for each of such groups, by adding tastes of users for browsing the advertisement, the presentation of the advertisement is given more directly. Thus, the effect of increasing the utilization rate of the advertisement can be expected.

Embodiment 4

Figure 11:
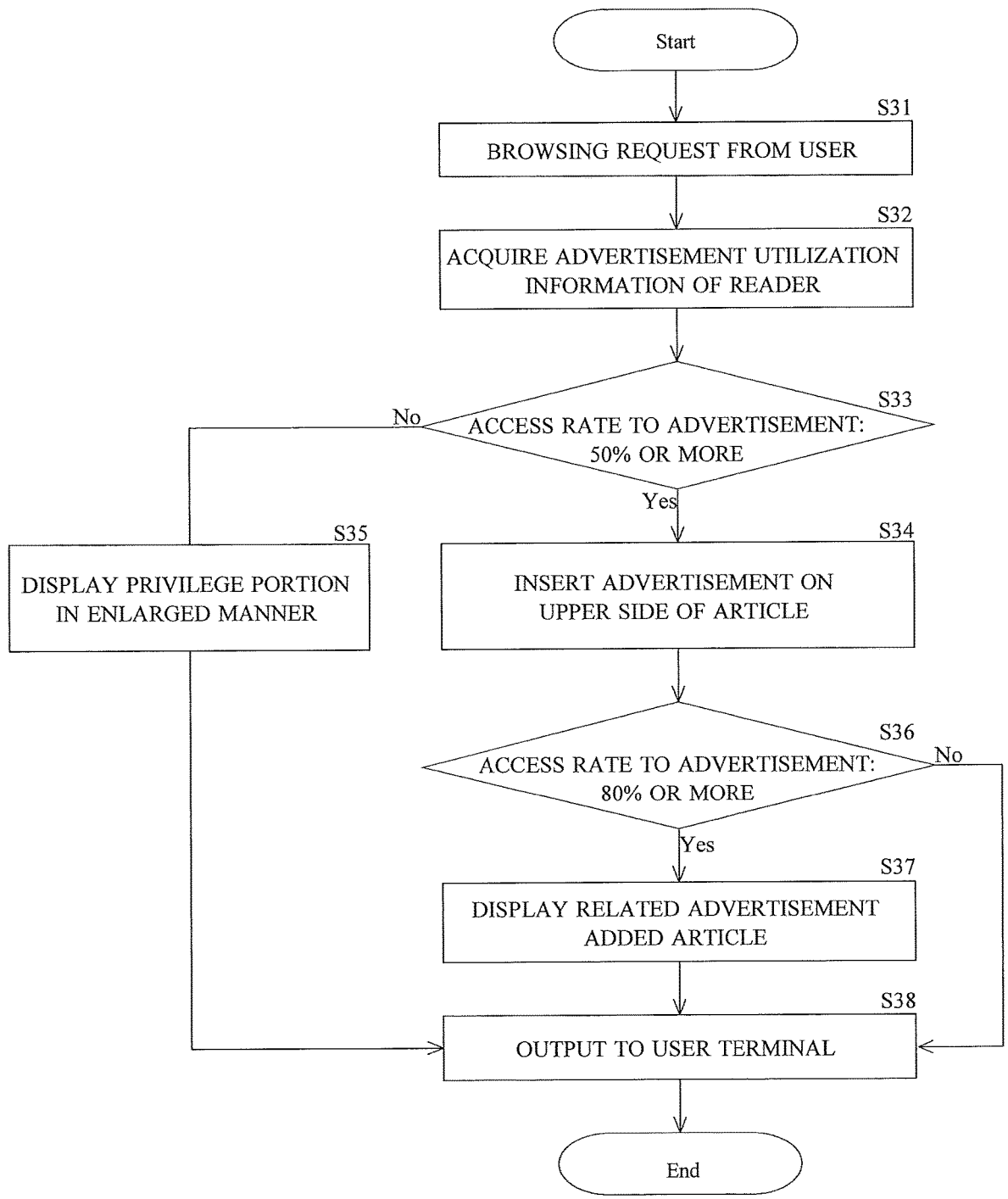
FIG. 11 shows a flowchart relating to a display method of an advertisement in accordance with embodiment 4 of the present invention.

Next, referring to FIG. 11, the following description will explain a modified example of an article display method depending on the advertisement utilization in the present embodiment. Additionally, in embodiment 4, those constituent elements that are the same as those of the other embodiments are indicated by the same reference numerals, and the description thereof is simplified.

The user who has logged in the advertisement information sharing server 1 carries out an output request of a selected article onto the advertisement information sharing server 1 (S31). The advertisement information sharing server 1 obtains the advertisement utilization information of the user relating to the browsing request from the user information 20a (S32).

The user's advertisement utilization information, which includes information relating to browsing and utilization of advertisements by the user, is such information as to be used for classifying individual users depending on advertisement utilization degrees. Moreover, based upon the classification, the display method of advertisements in an advertisement added article to be displayed on each of the users is altered. In the present embodiment, as the advertisement utilization information, an accessing rate to the advertisement is utilized. The accessing rate to the advertisement is defined as a rate obtained by dividing the number of accesses to the advertisement by the number of browsing sessions of the advertisement added article. The accessing rate used in this case is one example for use in classifying the advertisement utilization information, and of course, the classification may be carried out by using another method other than this.

In the case when the accessing rate to the advertisement is 50% or more (YES in step S33), the user's interest with the advertisement is considered to be high to a certain degree. Therefore, the advertisement is placed on the upper side of the article (S34), and displayed so as to soon become conspicuous to the user's eyes. Thereafter, the sequence proceeds to S36.

In the case when the probability of opening the advertisement is less than 50% (NO in step S33), the interest in the advertisement is considered to be not so high. Therefore, the portion relating to the advertisement utilization privilege to be displayed on the article is displayed with its area made larger (S35) so as to make the privilege contents conspicuous to the user's eyes. Thereafter, the sequence proceeds to step S38 where the output of the advertisement added article is carried out onto the user's terminal 3 relating to the output request of the user.

In the case when the accessing rate to the advertisement is 80% or more (YES in S36), the interest in the advertisement is considered to be very high. Therefore, another related advertisement is added to the advertisement added article that has been requested for its output, and displayed thereon (S37). Thereafter, the sequence proceeds to step S38 where the output of the advertisement added article including the added advertisement is carried out onto the user terminal 3 relating to the output request of the user.

In the case when the accessing rate to the advertisement is from 50% or more to 80% or less (NO in S36), an advertisement added article with an advertisement disposed on the upper side of the article is outputted to the user terminal 3 of the user who has carried out the output request (S28).

In accordance with the present embodiment, advertisements that have been presented to users in a uniform mode up to now may be altered and displayed depending on each of the users so that an effect for accelerating the user's advertisement utilization can be expected.

For the user who does not utilize advertisements positively, the user's interest in advertisements is raised by emphasizing the privilege, and for the user who positively utilizes advertisements, by presenting other related advertisements additionally, an effect for accelerating the utilization of advertisements by the users can be expected. Moreover, by recording the user's commodity taste, the resulting taste may be utilized for the display method of advertisements.

INDUSTRIAL APPLICABILITY

It becomes possible to operate an information sharing system that allows contribution and browsing of advertisement information to be positively carried out with high usability of the advertisement.

DESCRIPTION OF REFERENCE NUMERALS 1 advertisement information sharing server
10 user authentication unit
11 browsing unit
12 collation unit
13 contribution unit
14 advertisement addition unit
15 analysis unit
16 privilege control unit
17 output unit
2 data base
20 user data base
20a user information table
20b store information table
21 article data base
22 advertisement data base
23 browser data base
3 user terminal
4 store terminal
100 CPU
101 memory
102 communication device
103 input/output device
104 storage device

The invention claimed is:

1. An advertisement information sharing system comprising:
   a contributor terminal configured to output an article from a contributor;
   a user terminal configured to output user information; and
   an advertisement information sharing server that is configured to communicate with the contributor terminal and the user terminal,
   wherein the advertisement information sharing server comprises a storage unit storing a database and a processor configured to:
   receive the article output from the contributor terminal by way of a communication device;
   utilize an advertisement addition unit of the advertisement information sharing server to add advertisement information relating to an advertisement target to the article, the advertisement information containing contents relating to the advertisement target, so as to produce an advertisement added article;
   record the advertisement added article in an article database of the database;
   utilize an output unit of the advertisement information sharing server to output the advertisement added article to the user terminal by way of the communication device, wherein a user of the user terminal has relational factors that are mutual with the contributor wherein the relational factors indicate one or more characteristics of the user and the contributor including at least age, geographic region, hobbies, or life environment;
   after outputting the advertisement added article, record browsing history information received from the user terminal in a browsing database of the database, the browsing history information including contributor information of the advertisement added article and advertisement specifying information for specifying the advertisement added to the advertisement added article;
   utilize a collation unit of the advertisement information sharing server to determine an authentication based on the browsing history information of the user in the browsing database of the database and the advertisement specifying information in association with the user information and provide the authentication to a privilege control unit of the advertisement information sharing server; and
   utilize the privilege control unit to control the database so as to add, when the authentication is confirmed by the collation unit, a predetermined quantity of advertisement utilization privilege to both privilege information of the user in the database and the privilege information of the contributor described in the browsing history information in the database,
   wherein the user terminal or a store terminal is configured to associate the advertisement specifying information with the user information in a corresponding store based upon the advertisement information of the advertisement added article, and the user terminal or the store terminal is configured to output the association of the advertisement specifying information and the user information in the corresponding store to the advertisement information sharing server, and
   wherein the processor is further configured to record advertisement usability of each user on the database, and based upon the advertisement usability, determine a display method of the advertisement in the advertisement added article for displaying on the user terminal, the advertisement usability being calculated based on the number of accesses to the advertisement and the number of browsing sessions of the advertisement added article, and the display method of the advertisement including at least one of a position change of the advertisement to be displayed and a size change relating to the advertisement utilization privilege to be displayed.

2. The advertisement information sharing system according to claim 1, wherein the processor is further configured to deliver an added privilege to the user of the user terminal at a desired timing so as to be utilized.

3. The advertisement information sharing system according to claim 1, wherein the advertisement information includes positional information of a store; and the processor is further configured to select the advertisement information or the advertisement added article relating to stores located on the periphery at a desired point on a map specified by the user terminal, and to recommend the contribution of the advertisement added article or the browsing thereof.

4. The advertisement information sharing system according to claim 1, wherein the processor is further configured to add a contribution privilege to the privilege information of the contributor when adding the advertisement information relating to the advertisement target to the article information.

5. The advertisement information sharing system according to claim 1, wherein the processor is further configured to add a browsing privilege to the privilege information of a reader who has browsed the advertisement added article.

6. The advertisement information sharing system according to claim 1, wherein the processor is further configured to allow the user to publish an advertisement formed by the user.

7. The advertisement information sharing system according to claim 1, wherein the processor is further configured to analyze the article information so as to acquire target specifying information indicating the advertisement target.

8. The advertisement information sharing system according to claim 7, wherein the processor is further configured to give a warning to the contributor when the inputted article information includes a contribution non-recommendation subject.

9. The advertisement information sharing system according to claim 7, wherein the processor is further configured to add the advertisement to the recorded article by using the target specifying information, and to record the resulting data on the database as the advertisement added article.

10. The advertisement information sharing system according to claim 7, wherein the processor is further configured to select the advertisement information to be added to the article information inputted from the contributor terminal by using the target specifying information, and to present the resulting information to the contributor in a manner so as to be selectable.

11. The advertisement information sharing system according to claim 7, wherein the processor is further configured to carry out a collation process on a relationship between inputted article information and the advertisement information added to the inputted article information by using the target specifying information.

12. An advertisement information sharing server configured to communicate with a contributor terminal, the contributor terminal configured to output an article from a contributor, the advertisement information sharing server configured to receive the article by way of a communication device and add an advertisement to the article to produce an advertisement added article, and the advertisement information sharing server communicable with a user terminal configured to output user information; the advertisement information sharing server comprising a memory storing executable instructions, a processor connected to the memory and configured to execute the instructions, and a storage unit storing a database, wherein execution of the instructions causes the processor to:
utilize an advertisement addition unit of the advertisement information sharing server to add advertisement information relating to an advertisement target to article information containing contents relating to an advertisement target so as to produce the advertisement added article;
record the advertisement added article in an article database of the database;
utilize an output unit of the advertisement information sharing server to output the advertisement added article to the user terminal, wherein the user terminal has a user having relational factors that are mutual with the contributor, and the relational factors indicate one or more characteristics of the user and the contributor including at least age, geographic region, hobbies, or life environment;
after outputting the advertisement added article, record browsing history information received from the user terminal in a browsing database of the database, the browsing history information including contributor information of the advertisement added article and advertisement specifying information for specifying the advertisement added to the advertisement added article;
utilize a collation unit of the advertisement information sharing server to determine an authentication based on the browsing history information of the user in the browsing database of the database and the advertisement specifying information inputted from the user terminal in association with the user information and provide the authentication to a privilege control unit of the advertisement information sharing server; and
utilize the privilege control unit to control the database so as to add, when the authentication is confirmed by the collation unit, a predetermined quantity of advertisement utilization privilege to both privilege information of the user in the database and the privilege information of the contributor described in the browsing history information in the database, and
wherein the advertisement information sharing server is configured to receive an association of the advertisement specifying information with the user information in a corresponding store presented based upon the advertisement information of the advertisement added article from the user terminal or a store terminal installed in the corresponding store by way of the communication device, and wherein the processor is further configured to record advertisement usability of each user on the database, and based upon the advertisement usability, determine a display method of the advertisement in the advertisement added article for displaying on the user terminal, the advertisement usability being calculated based on the number of accesses to the advertisement and the number of browsing sessions of the advertisement added article, and the display method of the advertisement including at least one of a position change of the advertisement to be displayed and a size change relating to the advertisement utilization privilege to be displayed.

13. A method for sharing advertisement information, executed by a computer, the method comprising:
receiving an article from a contributor terminal by way of a communication device;
adding advertisement information relating to an advertisement target to the article, the article containing contents relating to the advertisement target, using an advertisement addition unit of an advertisement information sharing server to produce an advertisement added article;
recording the advertisement added article in an article database included in a database stored in a storage unit included in the advertisement information sharing server;
outputting the advertisement added article from the advertisement information sharing server to a user terminal by way of the communication device using an output unit of the advertisement information sharing server, wherein the user terminal has a user having relational factors that are mutual with the contributor, and the relational factors indicate one or more characteristics of the user and the contributor including at least age, geographic region, hobbies, or life environment;
after outputting the advertisement added article, recording browsing history information received from the user terminal in a browsing database of the database, the browsing history information including contributor information of a contributor of the article information and advertisement specifying information for specifying an advertisement added to the advertisement added article;
determining an authentication based on the browsing history information of the user in the browsing database of the database and the advertisement specifying information in association with the user information using a collation unit of the advertisement information sharing server and providing the authentication to a privilege control unit of the advertisement information sharing server;

using the privilege control unit to control the database to add, when the authentication is confirmed by the collation unit, a predetermined quantity of advertisement utilization privilege to both privilege information of the user in the database and the privilege information of the contributor described in the browsing history information in the database;

associating, at the user terminal or a store terminal, the advertisement specifying information with the user information in a corresponding store based upon the advertisement information of the advertisement added article, and outputting the association of the advertisement specifying information and the user information in the corresponding store from the user terminal or the store terminal to the advertisement information sharing server;

calculating advertisement usability based on the number of accesses to the advertisement and the number of browsing sessions of the advertisement added article;

recording the advertisement usability of each of the users on the database; and determining, based on the advertisement usability, a display method of the advertisement in the advertisement added article for displaying on the user terminal the display method of the advertisement including at least one of a position change of the advertisement to be displayed and a size change relating to the advertisement utilization privilege to be displayed.

* * * * *